(12) United States Patent
Wu

(10) Patent No.: US 9,191,816 B2
(45) Date of Patent: Nov. 17, 2015

(54) METHOD OF MANAGING AUTHORIZATION OF PRIVATE NODE B IN A WIRELESS COMMUNICATION SYSTEM AND RELATED DEVICE

(71) Applicant: HTC Corporation, Taoyuan County (TW)

(72) Inventor: Chih-Hsiang Wu, Taoyuan County (TW)

(73) Assignee: HTC Corporation, Taoyuan District, Taoyuan (TW)

( * ) Notice: Subject to any disclaimer, the term of this patent is extended or adjusted under 35 U.S.C. 154(b) by 142 days.

(21) Appl. No.: 14/019,530

(22) Filed: Sep. 5, 2013

(65) Prior Publication Data

US 2014/0010164 A1 Jan. 9, 2014

Related U.S. Application Data

(62) Division of application No. 12/533,007, filed on Jul. 31, 2009.

(51) Int. Cl.
| | |
|---|---|
| *H04L 1/00* | (2006.01) |
| *H04W 12/06* | (2009.01) |
| *H04L 29/06* | (2006.01) |
| *H04W 12/08* | (2009.01) |
| *H04W 24/02* | (2009.01) |
| *H04W 84/04* | (2009.01) |

(52) U.S. Cl.
CPC ............. *H04W 12/06* (2013.01); *H04L 63/107* (2013.01); *H04W 12/08* (2013.01); *H04W 24/02* (2013.01); *H04W 84/045* (2013.01)

(58) Field of Classification Search
CPC ... H04W 84/045; H04W 24/24; H04W 48/20; H04W 48/16; H04W 88/08; H04W 36/14; H04W 36/30; H04W 48/02; H04W 48/18
USPC ............ 370/328–331, 332; 455/435.1–435.3, 455/436–444, 449
See application file for complete search history.

(56) References Cited

U.S. PATENT DOCUMENTS

| | | | |
|---|---|---|---|
| 7,945,268 B2 | 5/2011 | Sung | |
| 7,995,994 B2 | 8/2011 | Khetawat | |
| 8,019,331 B2 | 9/2011 | Khetawat | |

(Continued)

FOREIGN PATENT DOCUMENTS

| | | |
|---|---|---|
| CN | 1816187 A | 8/2006 |
| CN | 101345673 A | 1/2009 |

(Continued)

OTHER PUBLICATIONS

Office action mailed on Dec. 2, 2013 for the U.S. Appl. No. 12/533,007, filed Jul. 31, 2009, p. 1-16.

(Continued)

*Primary Examiner* — Dady Chery
(74) *Attorney, Agent, or Firm* — Winston Hsu; Scott Margo

(57) ABSTRACT

A method of managing authorization of a private node-B in a wireless communication system is disclosed. The method includes performing cell searching, when a cell is found, reading system information corresponding to the cell, and then determining authorization validity of the private node-B according to the system information and licensed band area corresponding to the private node-B.

14 Claims, 6 Drawing Sheets

(56) References Cited

U.S. PATENT DOCUMENTS

| | | | |
|---|---|---|---|
| 8,132,256 | B2 | 3/2012 | Bari |
| 8,233,481 | B2 | 7/2012 | Grayson |
| 8,307,205 | B2 | 11/2012 | Cha |
| 8,400,975 | B2 | 3/2013 | Nagata |
| 8,433,325 | B2 | 4/2013 | Grayson |
| 8,472,377 | B2 | 6/2013 | Becker |
| 2008/0076386 | A1 | 3/2008 | Khetawat |
| 2008/0299992 | A1 | 12/2008 | Eitan |
| 2008/0305835 | A1 | 12/2008 | Johnstone |
| 2008/0318596 | A1 | 12/2008 | Tenny |
| 2009/0005031 | A1* | 1/2009 | Van Lieshout et al. ....... 455/425 |
| 2009/0092097 | A1 | 4/2009 | Nylander |
| 2009/0104905 | A1 | 4/2009 | DiGirolamo |
| 2009/0124235 | A1 | 5/2009 | Bosch |
| 2009/0180439 | A1* | 7/2009 | Tabery et al. ................ 370/331 |
| 2009/0238114 | A1* | 9/2009 | Deshpande et al. .......... 370/328 |

FOREIGN PATENT DOCUMENTS

| | | | |
|---|---|---|---|
| CN | 101478819 | A | 7/2009 |
| JP | 2008099292 | | 4/2008 |
| JP | 2009089185 | | 4/2009 |
| TW | I226807 | | 1/2005 |
| TW | I305993 | | 2/2009 |
| WO | 0141494 | A1 | 6/2001 |
| WO | 2008054165 | A1 | 5/2008 |
| WO | 2008090154 | A1 | 7/2008 |

OTHER PUBLICATIONS

Office action mailed on Sep. 15, 2014 for the Taiwan application No. 099114207, filed May 4, 2010, p. 1-12.

3GPP TR 24.801 V0.5.1 (Dec. 2007) "3GPP Technical Specification Group Core Network and Terminals, CT WG1 Aspects (Release 8)", Dec. 2007.

3GPP TSG RAN2#60bis R2-080002 "CSG and idle mode mobility", Jan. 2008.

Office action mailed on Aug. 31, 2012 for the China application No. 201010180932.0, filing date May 14, 2010, p. 1-11.

Office action mailed on May 9, 2013 for the U.S. Appl. No. 12/533,007, filed Jul. 31, 2009, p. 1-18.

Office action mailed on Jul. 26, 2013 for the Taiwan application No. 099114207, filing date May 4, 2010, p. 1-12.

Office action mailed on Mar. 3, 2014 for the Taiwan application No. 099114207, filing date: May 4, 2010, p. 1-13.

* cited by examiner

METHOD OF MANAGING AUTHORIZATION OF PRIVATE NODE B IN A WIRELESS COMMUNICATION SYSTEM AND RELATED DEVICE

CROSS REFERENCE TO RELATED APPLICATIONS

This is a divisional application of application Ser. No. 12/533,007, filed on Jul. 31, 2009, which is included in its entirety herein by reference.

BACKGROUND OF THE INVENTION

1. Field of the Invention

The present invention relates to methods and devices utilized in a wireless communication system, and more particularly, to methods and devices utilized in the wireless communication system for controlling selection for home cells.

2. Description of the Prior Art

A System Architecture Evolution (SAE) system, set forth by 3GPP (3rd Generation Partnership Project) is a packet core network architecture for UMTS (Universal Mobile Telecommunications System), addressing cost-efficient deployment and operations for mass-market usage of IP services. The main network evolutions include meeting the targets for a radio-interface of a long term evolution (LTE) system, simplified network architecture, an All-IP Network, only packet switched means for all services, no circuit switching, and support for mobility and service continuity between heterogeneous access networks, such as between 2G/3G, LTE, non-3GPP access systems.

The SAE core network, or an evolved packet system (EPS) core network, includes an MME (Mobility Management Entity), an S-GW (Serving Gateway) and a P-GW (PDN gateway). The MME is a control plane entity that manages the attachment to the network, the authentication of the user equipment (UE), and interfaces an E-RAN (evolved radio access network) for the creation of relevant radio bearers. The S-GW is a user plane entity handling packet forwarding uplink and downlink between the PDN gateway and the radio environment (e.g. E-RAN). The S-GW is always located in the network where the UE is camping.

Functions of the SAE include the Non-Access-Stratum (NAS) functions to be performed by the UE in idle mode, the NAS signalling procedures between the UE and an evolved packet core network (EPC) via an E-UTRAN (evolved UMTS radio access network) including eNBs (evolved Node-Bs), and layer 3 signalling procedures between the UE and the EPC via non-3GPP access networks.

Under NAS functions, home cell deployments are defined as a single eNB used in a building or a small group of cells, e.g. in a campus deployment. Access to home cells is restricted to particular subscribers. In home cell deployments, a CSG (closed subscriber group) cell as part of the PLMN (public land mobile network) is only suitable for a UE if an id of the CSG cell is in a whitelist of the UE. The whitelist is a list of CSG cell ids where the UE is allowed to camp.

In the home cell deployments, a CSG area is defined as a tracking area (TA) that consists of a cell or group of cells to which access is restricted to a defined group of users. An eNB, which belongs to a CSG area, sends the CSG cell area identity to the MME whenever authorization needs to be checked in the MME.

A private node-B usually owned by an individual is normally deployed in the home network to provide services for CSG subscribers. In provision of CSG business, a user attempting to be a CSG subscriber goes to an operator's store to subscribe the CSG services and thereby gets a private node-B. The user can use the private node B at home via Internet. The private node-B is set to communicate to the operator's EPS core network via IP connection. The private node B and the EPS core network (i.e. the MME or the Serving Gateway) authorize each other.

However, the user possibly takes the private node B out of the home network coverage, and the prior art does not specify how the private node-B and the EPS deal with this situation. AS a result, the private node B used in unauthorized area works in the same way as in home network coverage. In this situation, the private node-B may use a frequency band that belongs to other operators for data transmission. This is an illegal usage and makes interference to frequency bands licensed for other operators.

SUMMARY OF THE INVENTION

The present invention therefore provides a method and related communication device of controlling managing authorization of a private node-B of a wireless communication system that can avoid an illegal usage of the private node-B in an unauthorized area.

The present invention discloses a method of managing authorization of a private node-B in a wireless communication system. The method includes performing cell searching, when a cell is found, reading system information corresponding to the cell, and then determining authorization validity of the private node-B according to the system information and licensed band area corresponding to the private node-B.

The present invention further discloses a communication device of a wireless communication system for managing authorization of a private node-B to avoid illegal usage of the private node-B. The communication device includes a processor, a communication interfacing unit, a control unit and a computer readable recording medium. The processor is used for processing storage data. The communication interfacing unit is used for exchanging signals with a peer communication device. The control unit is coupled to the processor and communication interfacing unit, and used for controlling the communication interfacing unit and the communication device according to processing results of the processor. The computer readable recording medium is coupled to the processor and used for storing the storage data. The storage data includes program code for performing cell searching, program code for, when a cell is found, reading system information corresponding to the cell, and program code for determining authorization validity of the private node-B according to the system information and licensed band area corresponding to the private node-B.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
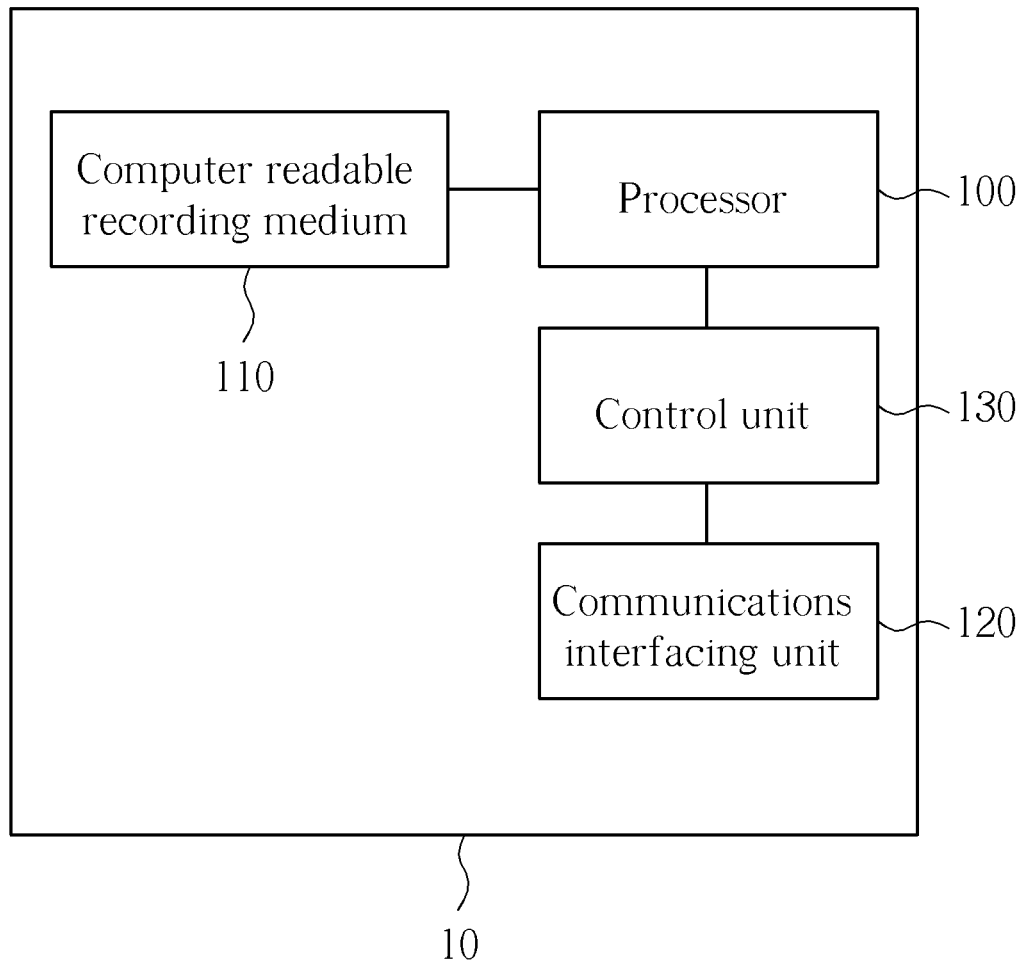
FIG. 1 is a schematic diagram of a communication device according to embodiments of the present invention.

Please refer to FIG. 1, which illustrates a schematic diagram of a communication device 10 according to embodiments of the present invention. The communication device 10 is preferably used in wireless communication system employing a system architecture evolution (SAE) core network and includes a processor 100, a computer readable recording medium 110, a communication interfacing unit 120 and a control unit 130. The computer readable recording medium 110 is any data storage device that stores storage data 112, including program code and related parameters, and the storage data 112 is thereafter read and processed by the processor 100. Examples of the computer readable recording medium 110 include read-only memory (ROM), random-access memory (RAM), CD-ROMs, magnetic tapes, hard disks, optical data storage devices, and carrier waves (such as data transmission through the Internet). The control unit 130 controls the communication interfacing unit 120 and related operations and states of the communication device 10 according to processed results of the process 100. The communication interfacing unit 120 is responsible for exchanging signals with a peer communication device which represents a communication device performs functions of a peer communication protocol.

The communication device 10 can be used in an EPS (evolved packet system) network device, such as an MME (Mobility Management Entity) or an S-GW (Serving Gateway), a Node-B in a UTRAN (UMTS radio access network), or an evolved Node-B in an E-UTRAN (evolved UTRAN). When the communication device 10 is used in the core network device, the communication device 10 exchanges signals from a NB (Node-B) or an eNB (evolved Node-B) with the communication interfacing unit 120 via cable, xDSL, or other IP access technologies. When the communication device 10 is used in the NB or eNB, a radio interface function is provided in the communication interfacing unit 120 for wireless signal exchange in addition to signal exchange with the core network device.

Figure 2:
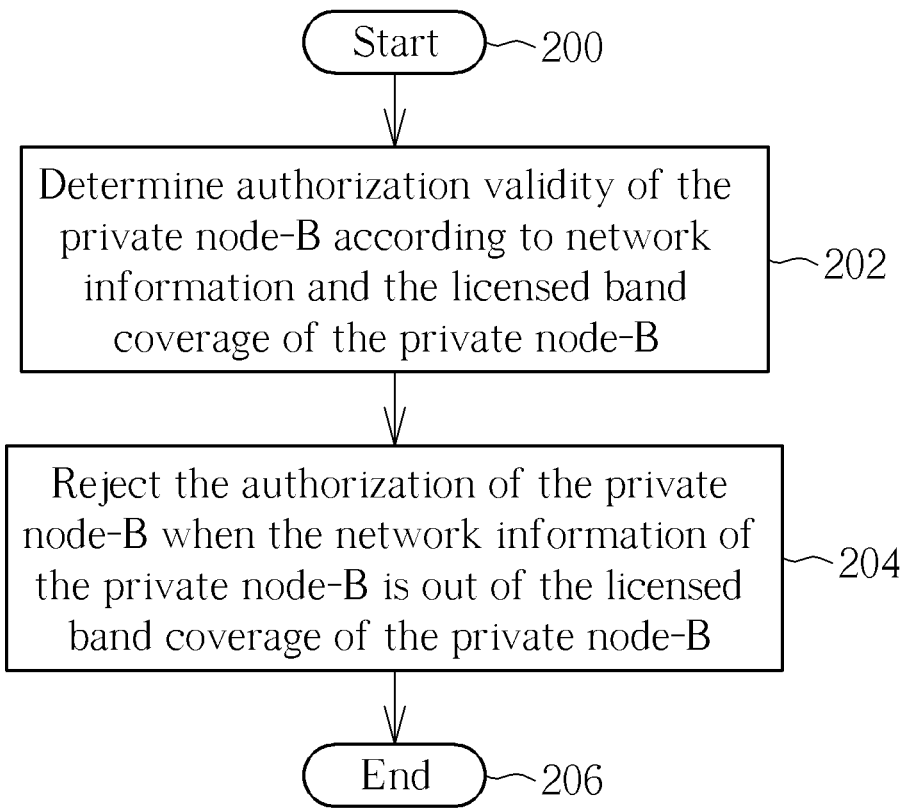
FIG. 2 is a flowchart of a process according to an embodiment of the present invention.

Please refer to FIG. 2, which illustrates a flowchart of a process 20 according to an embodiment of the present invention. The process 20 is applied to an EPS network for managing authorization of a private node-B. The process 20 can be compiled into the program code of the storage data 112 of FIG. 1 and includes the following steps:

Step 200: Start.

Step 202: Determine authorization validity of the private node-B according to network information and the licensed band coverage of the private node-B.

Step 204: Reject the authorization of the private node-B when the network information of the private node-B is out of the licensed band coverage of the private node-B.

Step 206: End.

According to the process 20, the EPS network knows the network information of the private node-B when the private node-B connects to the EPS network via a cable, xDSL or other IP (Internet Protocol) access technologies. Then, the EPS network determines the authorization validity of the private node-B according to network information and licensed band coverage. When the network information is determined to be out of the licensed band coverage, the EPS network rejects the authorization of the private node-B. On the contrary, when the network information is determined to be in the licensed band coverage, the EPS network accepts the authorization of the private node-B. Preferably, the network information used for the determination of authorization is an IP address of the private node-B, and the licensed band coverage includes a valid range of IP addresses for the private node-B.

Therefore, through the process 20, the EPS network can prevent the user from using the private node-B in an unauthorized area with the IP address.

Figure 3:
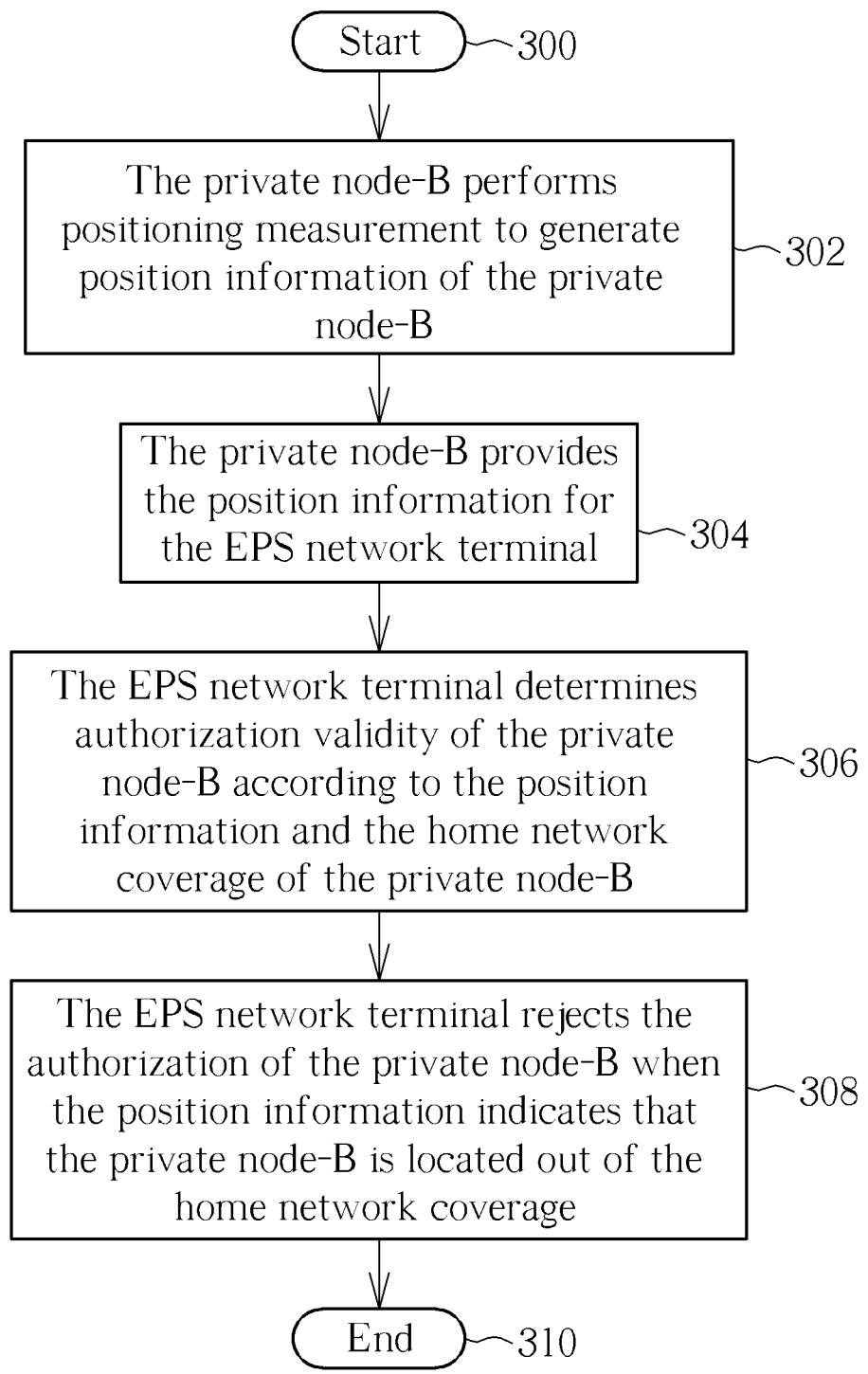
FIG. 3 is a flowchart of a process according to an embodiment of the present invention.

Please refer to FIG. 3, which illustrates a flowchart of a process 30 according to an embodiment of the present invention. The process 30 is utilized for managing authorization of a private node-B coupled to an EPS network terminal that stores home network coverage indicating valid accessible geographical coverage of the private node-B. The process 30 can be compiled into the program code of the storage data 112 of FIG. 1 and includes the following steps:

Step 300: Start.

Step 302: The private node-B performs positioning measurement to generate position information of the private node-B.

Step 304: The private node-B provides the position information for the EPS network terminal.

Step 306: The EPS network terminal determines authorization validity of the private node-B according to the position information and the home network coverage of the private node-B.

Step 308: The EPS network terminal rejects the authorization of the private node-B when the position information indicates that the private node-B is located out of the home network coverage.

Step 310: End.

According to the process 30, the private node-B provides the EPS network with its position information revealing geographical information of the private node-B. After receiving the position information, the EPS network terminal determines authorization validity of the private node-B according to the position information and the home network coverage. When the position information indicates that the private node-B is located out of the home network coverage, the EPS network terminal rejects the authorization of the private node-B. Preferably, the Node-B performs positioning measurement by means of a GPS (global positioning) system.

Therefore, the process 30 utilizes the geographical information of the private node-B to determine whether to grant authorization to the private node-B.

Figure 4:
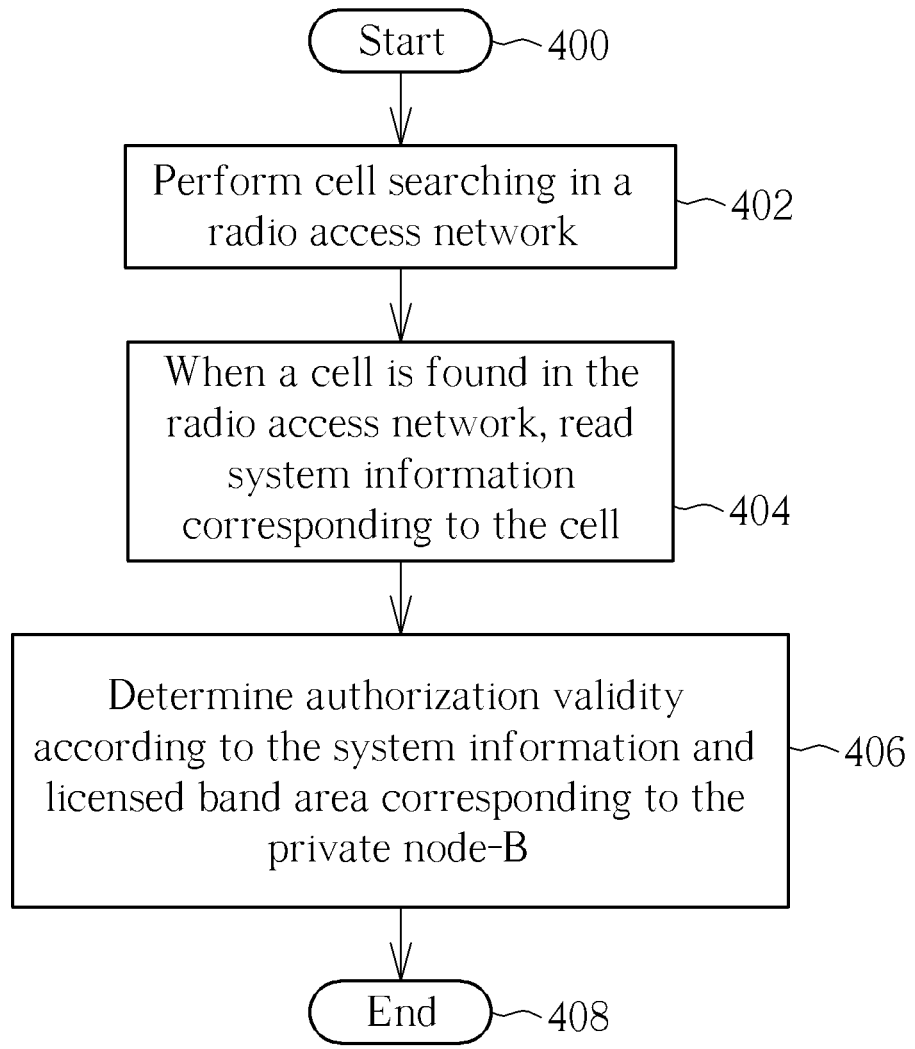
FIG. 4 is a flowchart of a process according to an embodiment of the present invention.

Please refer to FIG. 4, which illustrates a flowchart of a process 40 according to an embodiment of the present invention. The process 40 is utilized for a private node-B including predetermined licensed band area to manage its authorization. The process 40 can be compiled into the program code of the storage data 112 of FIG. 1 and includes the following steps:

Step 400: Start.

Step 402: Perform cell searching in a radio access network.

Step 404: When a cell is found in the radio access network, read system information corresponding to the cell.

Step 406: Determine authorization validity according to the system information and licensed band area corresponding to the private node-B.

Step 408: End.

According to the process 40, the private node-B performs cell searching in the radio access network when powering on. When any cell is found, the private node-B reads the system information of the cell and then determines its authorization validity according to the system information and the licensed band area.

Preferably, the private node-B stops performing cell searching and reading the system information when the system information of the found cell indicates that the private node-B is located in the licensed band area. On the contrary, when the system information indicates that the private node-B is out of the licensed band area, this means that the private node-B is used in the unauthorized area. In this situation, the private node-B keeps its transmitting functions deactivated. In other words, the private node-B does not perform any data transmission. Alternatively, the private node-B uses a license-free band, which does not make interference to frequency bands of other operators, for data transmission.

Preferably, the cell is a macro cell in a GSM EDGE radio access network (GERAN), a UMTS radio access network (UTRAN) or an evolved UMTS radio access network (E-UTRAN). When the cell is a GERAN or UTRAN cell, the read system information is a public land mobile network (PLMN) identity, a location area code (LAC) or a routing area code (RAC). When the cell is an E-UTRAN cell, the read system information is corresponding PLMN identity or Tracking Area Code (TAC).

Figure 5:
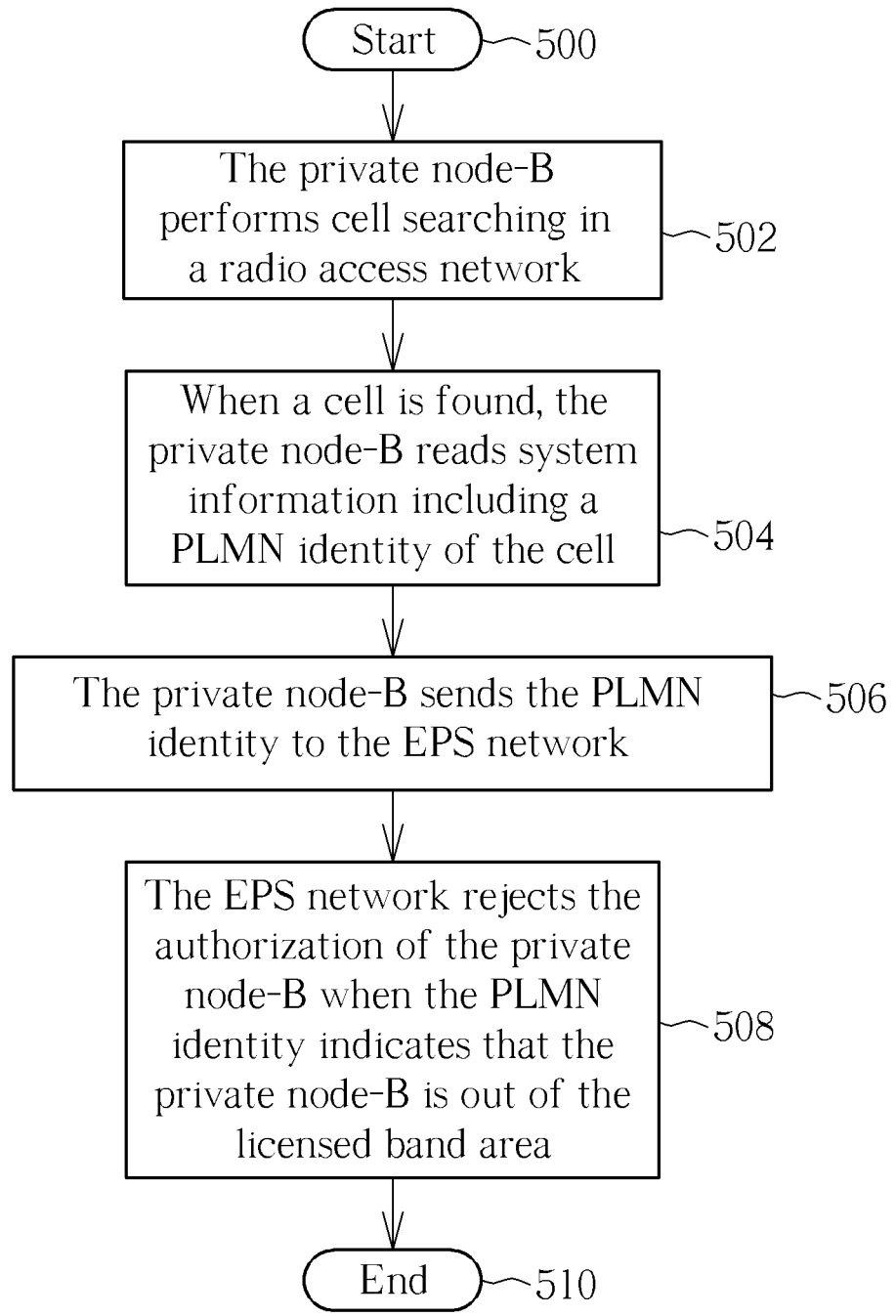
FIG. 5 is a flowchart of a process according to an embodiment of the present invention.

Please refer to FIG. 5, which illustrates a flowchart of a process 50 according to an embodiment of the present invention. The process 50 is utilized for managing authorization of a private node-B coupled to EPS network including predetermined licensed band area of the private node-B. The process 50 can be compiled into the program code of the storage data 112 of FIG. 1 and includes the following steps:

Step 500: Start.
Step 502: The private node-B performs cell searching in a radio access network.
Step 504: When a cell is found, the private node-B reads system information including a PLMN identity of the cell.
Step 506: The private node-B sends the PLMN identity to the EPS network.
Step 508: The EPS network rejects the authorization of the private node-B when the PLMN identity indicates that the private node-B is out of the licensed band area.
Step 510: End.

According to the process 50, the private node-B reads the PLMN identity from the found cell, which is preferably a GERAN, UTRAN, or E-UTRAN cell, and further sends the PLMN identity to the EPS network. After receiving the PLMN identity, the EPS network examines the PLMN identity according to the licensed band area and thereby rejects the authorization of the private node-B when the PLMN identity indicates that the private node-B is out of the licensed band area.

Therefore, the process 50 utilizes the PLMN identity of the cell found by the private node-B to determine whether to grant authorization to the private node-B.

Figure 6:
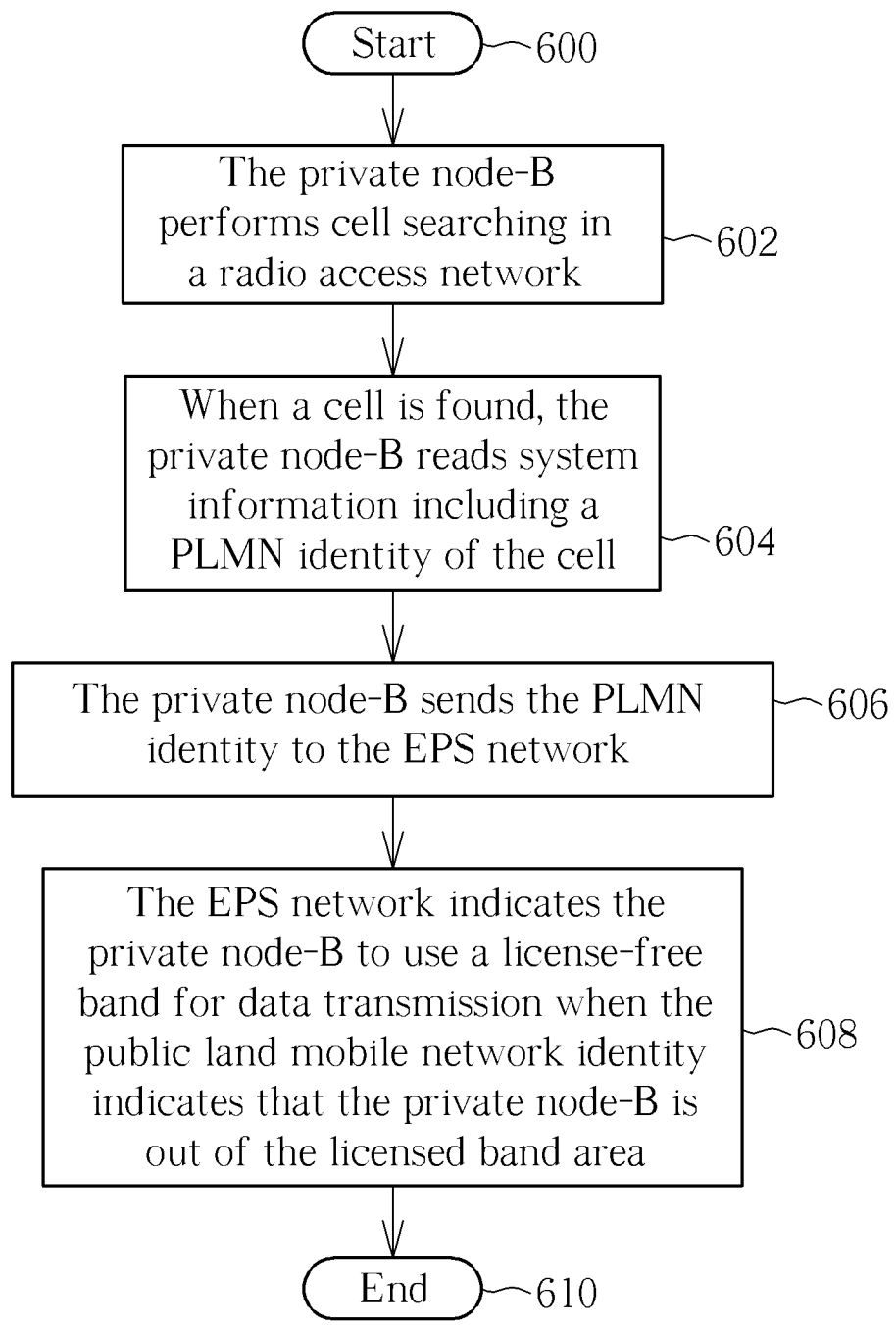
FIG. 6 is a flowchart of a process according to an embodiment of the present invention.

Please refer to FIG. 6, which illustrates a flowchart of a process 60 according to an embodiment of the present invention. The process 60 is utilized for managing authorization of a private node-B coupled to EPS network including predetermined licensed band area of the private node-B. The process 60 can be compiled into the program code of the storage data 112 of FIG. 1 and includes the following steps:

Step 600: Start.
Step 602: The private node-B performs cell searching in a radio access network.
Step 604: When a cell is found, the private node-B reads system information including a PLMN identity, LAC, RAC or TAC of the cell.
Step 606: The private node-B sends the PLMN identity, LAC, RAC or TAC to the EPS network.
Step 608: The EPS network indicates the private node-B to use a license-free band for data transmission when the public land mobile network identity indicates that the private node-B is out of the licensed band area.
Step 610: End.

In the process 60, Steps 600-606, 610 are executed in the same way as Steps 500-506, 510 respectively. Instead of rejecting all possible transmissions of the private node-B in Step 508, the EPS network executing Step 608 allows the private node-B to perform data transmission via the license-free band when the private node-B is used in the unauthorized area. The cell is a GERAN, UTRAN, or E-UTRAN cell.

In conclusion, the embodiments of the present invention avoid the private node B from being used in an unauthorized area by determining the authorization of the private node-B according to network, geographical or cell system information.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of managing authorization of a private node-B in a wireless communication system, the method comprising:
    performing cell searching;
    when a cell is found, reading system information corresponding to the cell, wherein the system information includes a public land mobile network (PLMN) identity, a location area code (LAC), a routing area code (RAC) or a Tracking Area Code (TAC);
    determining authorization validity of the private node-B according to the system information and a licensed band area corresponding to the private node-B, comprising:
        coupling the private node-B with a packet core network of the wireless communication system;
        sending the PLMN identity to the packet core network; and
        rejecting the authorization of the private node-B when the PLMN identity indicates that the private node-B is out of the licensed band area; and
    when the private node-B is out of the licensed band area, indicating to the private node-B to use a license-free band for data transmission.

2. The method of claim 1, wherein the cell is a macro cell.

3. The method of claim 1 further comprising stopping performing cell searching and reading corresponding system information when the system information indicates that the private node-B is located in the licensed band area.

4. The method of claim 1, wherein the cell belongs to a GSM EDGE radio access network or a UMTS radio access network.

5. The method of claim 4, wherein determining authorization validity of the private node-B according to the system information and the licensed band area corresponding to the private node-B comprises:
    coupling the private node-B with a packet core network of the wireless communication system;
    sending the PLMN identity to the packet core network; and
    indicating to the private node-B to use the license-free band for data transmission when the PLMN identity indicates that the private node-B is out of the licensed band area.

6. The method of claim 1, wherein the cell belongs to an evolved UMTS radio access network.

7. The method of claim 1 further comprising keeping transmitting functions of the private node B deactivated when the system information indicates that the private node-B is out of the licensed band area.

8. A communication device of a wireless communication system for managing authorization of a private node-B to avoid illegal usage of the private node-B, the communication device comprising:
- a processor for processing storage data;
- a communication interfacing unit for exchanging signals with a peer communication device;
- a control unit coupled to the processor and communication interfacing unit, for controlling the communication interfacing unit and the communication device according to processing results of the processor; and
- a computer readable recording medium coupled to the processor, for storing the storage data;
- wherein the storage data comprises:
  - program code for performing cell searching;
  - program code for, when a cell is found, reading system information corresponding to the cell, wherein the system information includes a public land mobile network (PLMN) identity, a location area code (LAC), a routing area code (RAC) or a Tracking Area Code (TAC);
  - program code for determining authorization validity of the private node-B according to the system information and a licensed band area corresponding to the private node-B, comprising:
    - coupling the private node-B with a packet core network of the wireless communication system;
    - sending the PLMN identity to the packet core network; and
    - rejecting the authorization of the private node-B when the PLMN identity indicates that the private node-B is out of the licensed band area; and
  - program code for when the private node-B is out of the licensed band area, indicating to the private node-B to use a license-free band for data transmission.

9. The communication device of claim 8, wherein the cell is a macro cell.

10. The communication device of claim 8, wherein the storage data further comprises program code for stopping performing cell searching and reading corresponding system information when the system information indicates that the private node-B is located in the licensed band area.

11. The communication device of claim 8, wherein the cell belongs to a GSM EDGE radio access network or a UMTS radio access network.

12. The communication device of claim 11, wherein the program code for determining authorization validity of the private node-B according to the system information and the licensed band area corresponding to the private node-B comprises:
- coupling the private node-B with a packet core network of the wireless communication system;
- sending the PLMN identity to the packet core network; and
- indicating to the private node-B to use the license-free band for data transmission when the PLMN identity indicates that the private node-B is out of the licensed band area.

13. The communication device of claim 8, wherein the cell belongs to an evolved UMTS radio access network.

14. The communication device of claim 8, wherein the storage data further comprises program code for keeping transmitting functions of the private node B deactivated when the system information indicates that the private node-B is out of the licensed band area.

* * * * *